Patented May 3, 1932

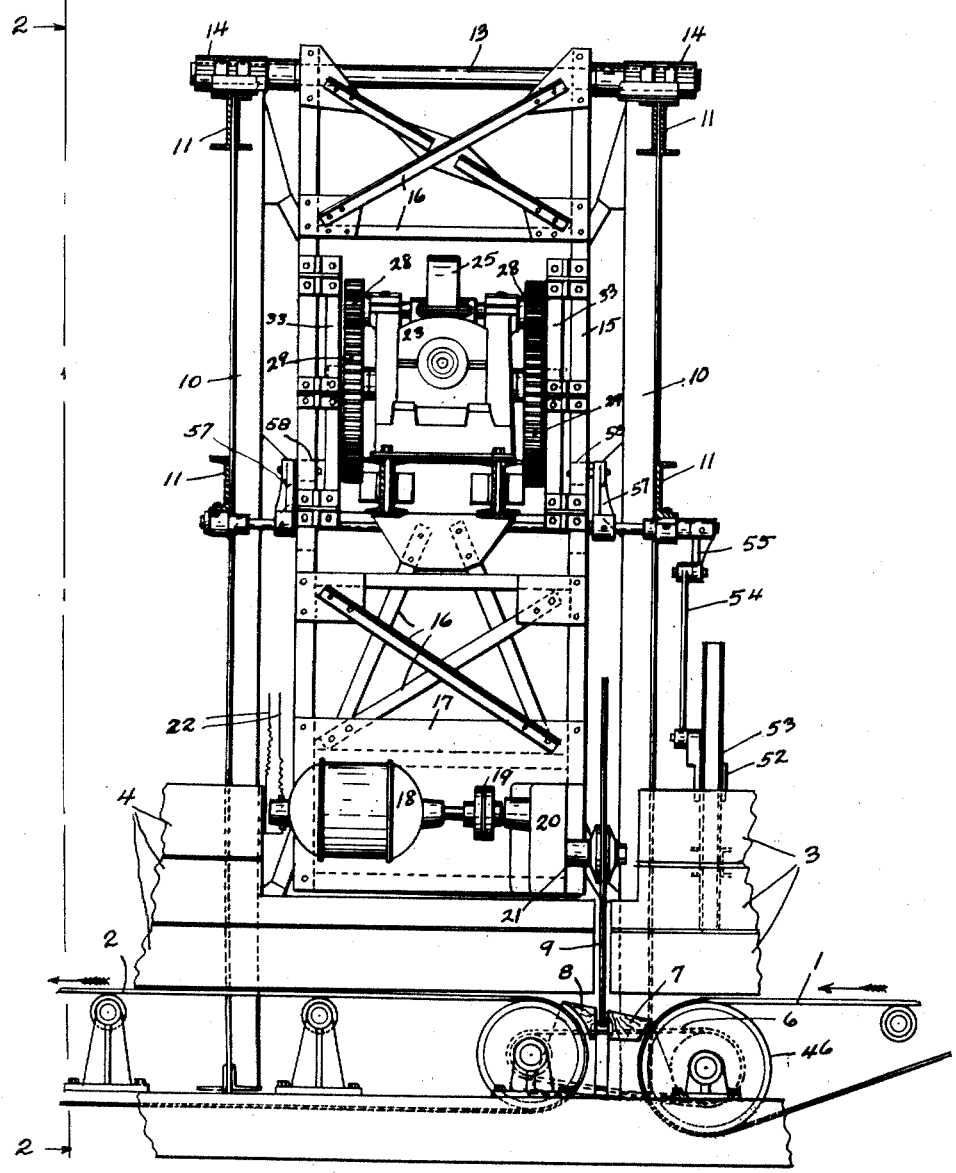

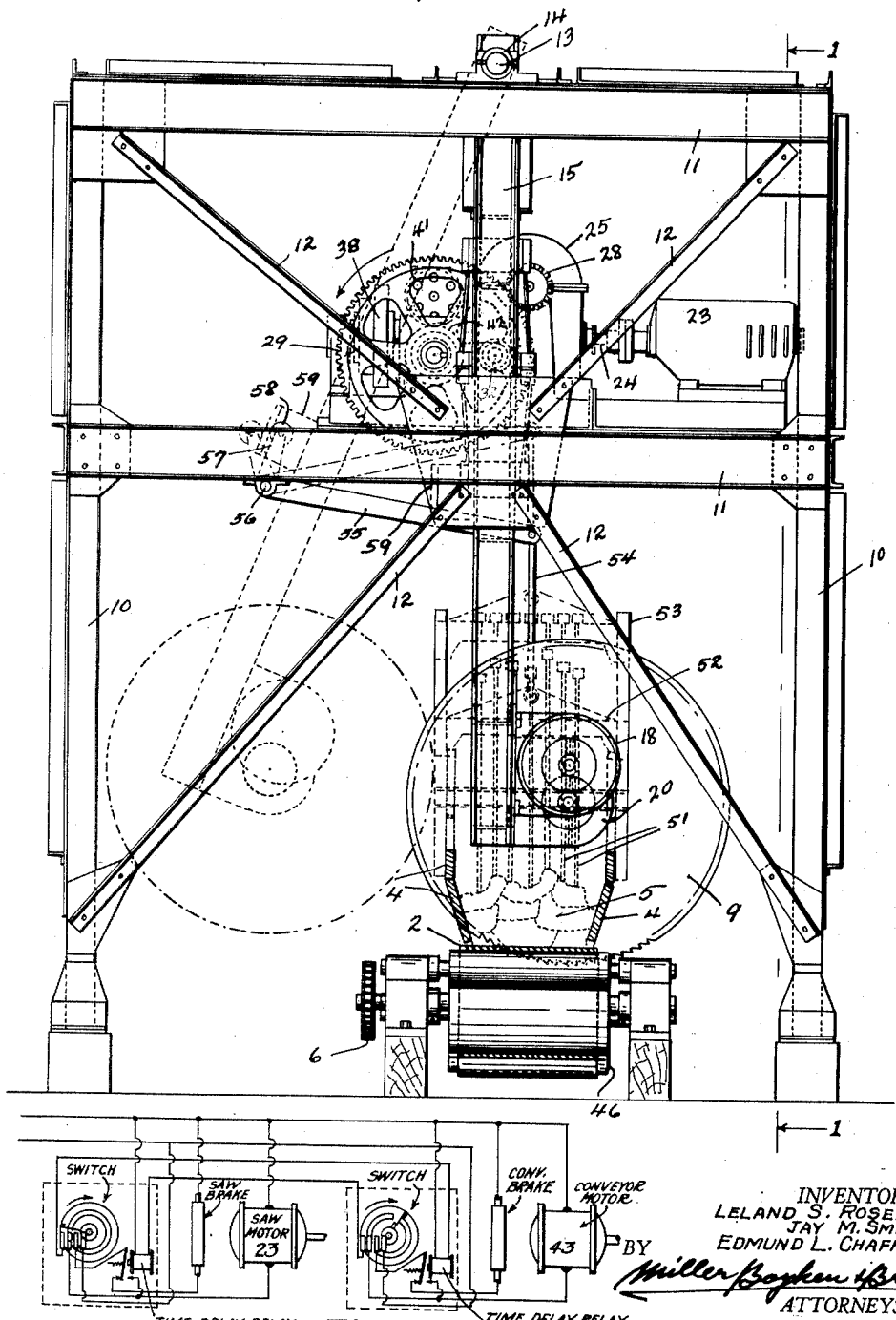

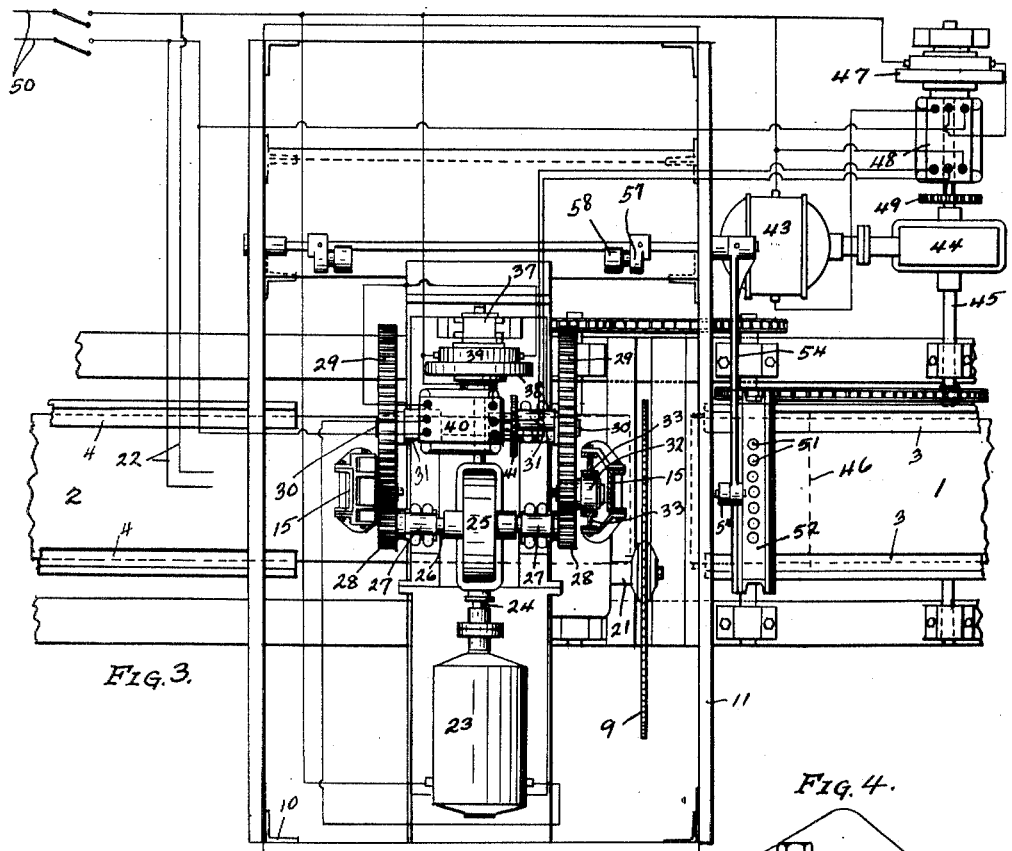

1,856,169

UNITED STATES PATENT OFFICE

LELAND S. ROSENER, JAY M. SMITH, AND EDMUND L. CHAFFEE, OF SAN FRANCISCO, CALIFORNIA, ASSIGNORS TO THE PACIFIC LUMBER COMPANY, OF SAN FRANCISCO, CALIFORNIA, A CORPORATION OF MAINE

SWING CUT-OFF SAW APPARATUS

Application filed July 7, 1930. Serial No. 465,998.

This invention relates to swing cut-off saw apparatus and has for its objects special apparatus of this kind which will automatically advance a supply of material, saw off short lengths and discharge the sawed material.

The bark of the redwood tree, native in California, is very thick, often measuring a foot or more in thickness, and it is the primary object of the present apparatus to handle this bark after stripping from the gigantic trees and automatically reduce it to short lengths preparatory to passing same to shredding machines for separating the bark fibers for use in various industries.

Briefly described, the apparatus comprises a pair of horizontally arranged belt conveyors for transporting the bark in random lengths as stripped from the trees. These conveyors are arranged in tandem with a small gap between and in which gap runs a large circular saw of the swing cut-off type mounted on a frame extending above the conveyors. The saw and conveyors are electrically driven and the hook up is such that with the saw out of the path of the conveyors the bark is advanced a distance, say six feet, conveyors stopped, saw swung through the material and returned, conveyors again started as before. An electric brake clamps the saw swinging motor to hold saw elevated from work at the end of its return stroke, and a similar brake stops the conveyor drive motor so as to hold the conveyors motionless during the swinging cut of the saw.

In the drawings accompanying this application Fig. 1 is an elevation of the apparatus showing the two adjacent ends of the conveyors, the saw blade in the gap, and the swing saw frame and its mechanism. The view shows some of the saw frame members in section as it is taken just inside of the outer posts of the frame along the line 1—1 of Fig. 2.

Fig. 2 is a side view of the apparatus as seen from the line 2—2 of Fig. 1.

Fig. 3 is a plan view of the apparatus showing the swing frame drive and conveyor drive motors, and with part of one swing frame driving guide broken away.

Fig. 4 is a fragmentary enlarged plan view showing one of the rollers which operate in the swing frame guides for swinging the saw frame.

Fig. 5 is a cross section of Fig. 4 taken along the line 5—5 thereof showing the internal structure of the roller and its mounting arrangement with respect to the driving gear from which it projects and Fig. 6 is a diagrammatic view of the electrical hook-up whereby the saw motion and conveyor motion are automatically alternately actuated with the conveyor motor and saw brake energized.

In further detail, the horizontally arranged belt conveyors 1 and 2 are of heavy well known construction all mounted on a suitable foundation or supporting structure indicated, and they are provided with slightly converging side walls 3, 4 of heavy planks or other construction spaced above the conveyor belts so as to form a trough to hold a relatively large load of bark in place on the conveyors as indicated at 5 in Fig. 2.

Belt conveyor 1 is the supply or feeding conveyor for the material while conveyor 2 is the discharge or take off conveyor for the sawed material and is driven or geared as by chain drive 6 to run a trifle faster than the feeding conveyor so as to have a straightening out effect upon the lengths of bark as delivered to it from conveyor 1. The gap between the conveyors is provided with a pair of transversely extending supports 7, 8 between which the large circular swing saw 9 operates.

This saw is usually about 5 or 6 feet in diameter and is carried on a rectangular frame preferably of structural steel construction comprising posts 10, laterals 11 and braces 12 and has extending across its upper end a shaft 13 rotatably supported in bearings 14 and to which shaft is secured the upper end of a swing frame comprising a pair of heavy structural channels 15 suitably tied together by lateral and angular bracing 16 and at the lower end by a relatively large plate 17 on which is mounted an electric motor 18 for driving the saw. This motor is connected by a flexible coupling 19 to the high speed shaft of a gear reduction of conventional design in a box 20, the slow speed shaft of which forms the mandrel 21 of the saw 9. Motor 18 is independently supplied with current through wires indicated at 22 from an outside source in any desired manner not detailed.

The saw frame is automatically swung back and forth by a separate motor 23 and gearing carried on the main frame. This motor is preferably of D. C. mill type compound wound with heavy series fields and is directly connected to the high speed shaft 24 of a worm gear or other speed reducing gear enclosed in box 25, the slow speed shaft 26 of which extends transversely above the motor shaft, is rotatably supported in bearings 27 and carries a spur pinion 28 at both ends meshing respectively with large spur gears 29 mounted at the ends of a countershaft 30 rotatably supported in bearings 31, and which large gears each carry at their outer sides a roller 32 which operates up and down in guides 33 carried by the two main channel frame members 15 of the swing frame so that as the gears revolve, the rollers being carried about a circular path in the nature of a pair of crank arms, will positively swing the saw frame back and forth.

It should be noted that the direction of rotation of the gears is as indicated in the arrow of Fig. 2 so that the return stroke of the saw is much quicker than the sawing or downward swinging stroke, due to the rollers acting closer to the pivot 13 of the swing frame on the return stroke thereof.

In detail the construction of these rollers 32 will be seen in Figs. 4 and 5 and wherein the guides 33 are seen to clear the rollers so that they will roll on one side in one direction of travel and on the other side coming back. The rollers are hollow shells fitted inside with conical type roller bearings 34 complete with their races as indicated all carried on heavy pins 35 bolted to the side of the gears, while surrounding the outer ends of the pins and completely enclosing the bearings are caps as at 36 forming grease receptacles.

The shaft of motor 23 extends through the gear reduction housing 25 for support at its outer end in a bearing 37 and carries one element 38 of an electric brake of any suitable electrical construction not involved in the present invention, and the other element 39 of which is carried by the bearing 37 or otherwise rigidly secured in place, while above the gear shaft 30 is mounted a switch box 40 containing electrical contacts driven by a spur gear 41 meshing a similar size spur gear 42 just under it and secured to gear shaft 30, so that the switch elements will make one cycle for each downward and upward swinging of the saw frame or each revolution of gears 29.

A similar electric motor 43 and reduction gear 44 is used to drive the conveyors through shaft 45 which is chain geared at one end to the drive pulley 46 for the feeding conveyor, while at the other end it is fitted with an electric brake 47 as described for the saw frame drive. A switch box 48 similar in all respects to switch box 40 is mounted above conveyor drive shafts 45 and its elements driven by a spur gear 49 meshing a similar size spur gear just below it on shaft 45 so that its control elements will be given a complete cycle at each revolution of the shaft, the size of the conveyor head pulley 46 being so proportioned as to advance the conveyor the required distance (about six feet) at each revolution.

As the construction of such electric switches is standard and well known no details thereof are included herein to unnecessarily pad the specification, but it will suffice to say that the two switch boxes, motors and electric brakes are so wired by the circuits indicated from power wires 50 that either motor 43 or 23 will operate until either shaft 45 or shaft 30, as the case may be, makes one turn to advance the conveyors or swing the saw frame downwardly and back, and to turn the switch mechanism in its respective box 48 or 40 to thereby shut off the current to its motor, energize the electric brake and close the circuit to the other motor.

Thus one motor drives its attached mechanism one cycle, is cut out, machinery stopped by the brake and the other brake released and motor cut in for like performance.

Since, as stated such switch mechanism is well known and not claimed herein no details are shown in the drawings, but the circuits indicated on Fig. 3 together with the above explanation will make it perfectly clear to anyone skilled in the art.

A further feature of the apparatus is a series of vertically movable clamping bars which are lowered upon the bark in the conveyor trough between the sides thereof adjacent the saw just before the saw swings in its cutting stroke. These bars are shown at 51 and are iron bars aligned in loose holes in a yoke member 52 slidably guided in vertical guides 53 secured to and projecting upward from the conveyor trough walls. The bars are headed so they may all be simultaneously lifted when the yoke is raised but will be free to assume various positions of vertical displacement when lowered to impinge the bark with their lower ends as indicated in Fig. 2.

The yoke is lifted by a rod 54 pivotally connected at its lower end to the yoke and at its upper end to a long crank 55 secured to a shaft 56 revolvably supported across the frame of the machine and provided with two small crank arms 57 carrying rollers 58 which are contacted and forced over by blocks 59 carried by the channel members 15. Thus the bark in the trough, though in any number of layers and of uneven and constantly varying cross section, will be sufficiently clamped adjacent the saw just before each cut, and released before the conveyor is started to advance the material for the next cut.

Having thus described our invention it will be evident that variations may be made without departing from the spirit of the invention as sought to be covered in our appended claims.

We claim:

1. In apparatus of the character described, a pair of belt conveyors arranged in tandem with a gap between their adjacent ends, a swing saw mounted to pass between said ends and means for alternately moving and stopping said conveyors and swinging the saw and a pair of fixed supports extending transversely of the conveyor in the gap between the ends of the conveyors, free of the conveyors, the upper surfaces of said supports being substantially flush with the upper surfaces of the conveyors, said conveyors spaced from each other a distance to pass the saw.

2. In apparatus of the character described, a conveyor adapted to transport slabs of redwood bark, a swing cut-off saw mounted to swing past the end of the conveyor, means for swinging said saw and operating said conveyor intermittently in sequence, and means operated by the swinging of the saw frame for clamping material upon said conveyor during the sawing thereof.

3. A supporting frame, a swinging frame pivotally suspended at its upper end from said frame, a circular saw at the lower end of said frame, guides along said swinging frame, a shaft revolvably supported on said supporting frame, a gear secured to the end of said shaft, a roller carried on the side of said gear engaging said guides whereby upon revolving of the gear one turn said swinging frame will be oscillated from one extreme position to the opposite extreme position and return, means for revolving said gear and means for automatically locking the gear at the end of each turn.

4. A supporting frame, a swinging frame pivotally suspended at its upper end from said frame, a circular saw at the lower end of said frame, guides along said swinging frame, a shaft revolvably supported on said supporting frame, a gear secured to the end of said shaft, a roller carried on the side of said gear engaging said guides whereby upon revolving of the gear one turn said swinging frame will be oscillated from one extreme position to the opposite extreme position and return, an electric motor mounted on the supporting frame arranged for driving said gear, an electric brake associated with said motor and gear for stopping the same, and switch means operated by said motor whereby upon starting the motor the gear will be revolved one turn, the motor de-energized and the brake set to stop further motion of the parts.

5. In a structure as specified in claim 4, a conveyor arranged for delivering material to said saw, a second electric motor driving the conveyor, a second electric brake associated with the motor and conveyor for stopping the same, and switch means operated by the motor arranged to stop the motor after a predetermined movement of the conveyor and to energize said second electric brake for stopping the conveyor and motor.

6. A swing cut-off saw, an electric motor, gear means between said motor and swing saw arranged for swinging the saw, an electric brake for stopping the motor and gear means for holding the saw from swinging, a conveyor arranged for feeding material to the saw for cutting, a second electric motor driving said conveyor, a second electric brake for stopping the second motor and conveyor, and a plurality of electric switch means operated respectively by the saw swinging drive and the conveyor drive arranged and adapted for alternately energizing one of the motors and de-energizing the other while energizing the brake of the latter and de-energizing the brake of the former.

7. A swing saw comprising a supporting frame, a swing frame pivotally suspended at its upper end from said supporting frame, a reducing gear set carried at the lower end of said swing frame, a circular saw secured to the slow speed shaft of said reducing gear, a motor carried by the swing frame connected to the high speed shaft of said reducing gear, a second motor mounted on the supporting frame, reduction gearing carried on the supporting frame driven by said second motor and including a revolvable shaft with crank arms engaging said swing frame for oscillating the same.

8. A swing saw comprising a supporting frame, a swing frame pivotally suspended at its upper end from said supporting frame, a reducing gear set carried at the lower end of said swing frame, a circular saw secured to the slow speed shaft of said reducing gear, a motor carried by the swing frame connected to the high speed shaft of said reducing gear, a second motor mounted on the supporting frame, reduction gearing carried on the supporting frame driven by said second motor and including a revolvable shaft with crank arms engaging said swing frame for oscillating the same and means for automatically de-energizing said second motor upon each revolution of said crank arms.

9. In an apparatus of the character described, a pair of belt conveyors arranged in tandem with a gap between said ends, a swing saw mounted to pass between said ends and means for alternately moving and stopping said conveyors and swinging the saw, sides above the conveyors arranged to form a trough, said sides extending beyond the adjacent ends of the conveyors.

LELAND S. ROSENER.
JAY M. SMITH.
EDMUND L. CHAFFEE.